Patented Nov. 15, 1927.

1,649,592

UNITED STATES PATENT OFFICE.

JULES ADOLPHE HENRY ITIER, OF PARIS, FRANCE, ASSIGNOR TO SOCIETY: LE TEXTILON CENTRAL, OF PARIS, FRANCE, A CORPORATION OF FRANCE.

PROCESS FOR RENDERING SURFACES FLUID TIGHT.

No Drawing. Application filed February 12, 1926, Serial No. 87,986, and in France February 18, 1925.

In the use of cement or concrete recipients for containing the hot or cold solutions which are employed in various chemical processes for the treatment of materials, difficulties arise which are due to the reactions resulting from the nature of the bath and the composition of the cement walls.

But the chemical action upon the surface of the cement or concrete and even a certain amount of damages to this surface, is a difficulty of a secondary order as compared with more serious changes which take place, for instance the essential modifications of the bath whereby the character of the treatment may even be entirely altered. With the use of reinforced concrete, a great danger consists in the action upon the metal reinforcing parts, with the formation of rust, which has various bad results. For instance in the case of hypochlorite of lime or like alkaline substances, any traces of metallic oxides will act as reducing agents, and thus an increased amount of chlorine is given off in the gaseous state. In the industry of the bleaching of textile products, it is a matter of common knowledge that the action of chlorine must receive careful attention to prevent the destruction of the fibres.

The same is true for the acid baths, either as regards the action upon the surface of the cement or concrete, or upon the metal reinforcing parts.

It is further observed that the cement or concrete often becomes porous to a marked degreee, and thus under pressure loses its fluidtight qualities.

My invention has for its object to obviate all such defects in cement or concrete construction, so that acids or alkalies will no longer act upon the internal or external surfaces of vats, tanks or like recipients and the conduits therefor, or upon cement or concrete surfaces of any kind.

According to principle of my said invention, I firstly unite and combine in a special manner products and methods which have been hitherto separately employed, and secondly I perform the operations in a certain order, this being an essential point for the obtainment of the desired result.

The following description shows by way of example the application of the said invention to the treatment of the inner surface of a vat or tank of reinforced concrete construction.

The essential operations are as follows:

1. Coating of the concrete (or cement) surface with commercial silicate of potassium in concentrated solution.
2. Drying in air.
3. Several coats of sulphuric acid at 65 degrees B.
4. Complete drying by evaporation.
5. Moistening of the surface thus treated, by filling the tank at the room temperature with acidulated water in the proportion of 10 kilog. of $H_2SO_4$ of 65 degrees B. per 100 liters water.
6. Emptying of the tank after several days, rinsing with water, and filling with a solution of pectinate or of alginate of sodium of 3 degrees B.
7. Discharge of the acidulated bath after several days, without subsequent rinsing.
8. Filling of the tank with a resin soap solution consisting of mixtures of ordinary soap and of the resinate of sodium obtained by dissolving colophony in soda lye.

The substances employed in the aforesaid treatment and the succession of the operations in the order disclosed will lead to the formation, by double decomposition, of complex insoluble salts and due to the porosity of the cement (or concrete) which is subjected to the pressure of the liquids, the said salts will remain within the layer of cement which is thus treated, so that the latter will be made fluidtight and will not be acted upon by acids or alkalies.

In my said treatment of cement or concrete surfaces, if the question relates to blocks, walls or the like, it will be obviously impossible to employ the baths as disclosed in paragraphs 5, 6 and 8, but in this event I employ an abundant and frequently repeated moistening which may be effected by means of streams or spraying, or by causing the liquid to flow along the surface by suitable means, or otherwise in an adequate manner according to circumstances.

What I claim is:

1. A process for rendering the surfaces of cement or concrete fluid tight, consisting in successively coating with silicate of potassium in concentrated commercial solution, coating with sulphuric acid of about 65° Baumé, moistening the surface thus treated with acidulated water, then moistening with a solution of pectinate of sodium of 3° Baumé, and finally moistening with a solution of resin soap, each coating being allowed to dry before the next is applied.

2. A process for rendering cement or concrete surfaces fluid tight consisting in successively applying to such surfaces coatings of silicate of potassium, concentrated sulphuric acid, acidulated water, a solution of a sodium compound of the group comprising alginates and pectinates, and a solution of resin soap, and allowing each liquid coating to dry before the next solution is applied, substantially as set forth.

3. A process for rendering the surfaces of cement or concrete fluid tight, consisting in coating with silicate of potassium in concentrated commercial solution, then coating with sulphuric acid of about 65° Baumé, moistening the surface thus treated with acidulated water, then moistening with a solution of a sodium compound of the group comprising alginates and pectinates, of 3° Baumé, and finally moistening with a solution of a resin soap, each coating being allowed to dry before the next is applied.

In testimony whereof I affix my signature.

JULES-ADOLPHE HENRY ITIER.